May 28, 1963   W. M. BUSKES   3,091,528
PROCESS AND LIGHT-SENSITIVE SHEETS FOR THE
PRODUCTION OF PIGMENT IMAGES BY TRANSFER
Original Filed March 9, 1953                    3 Sheets-Sheet 1
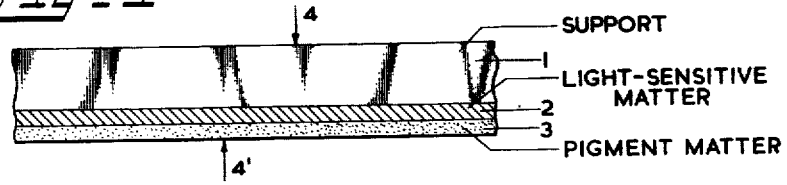
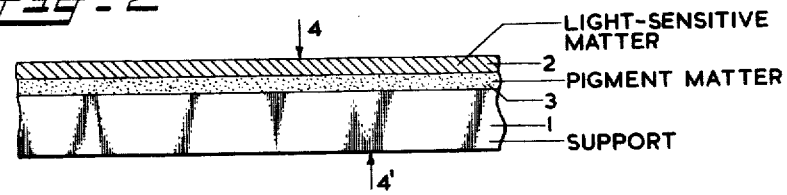
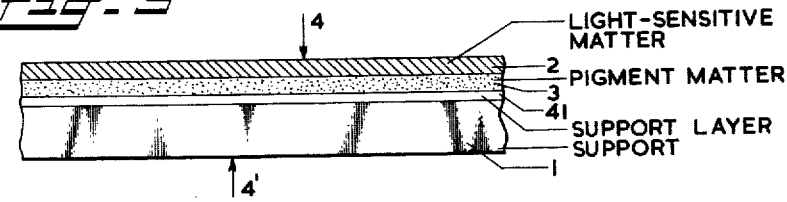
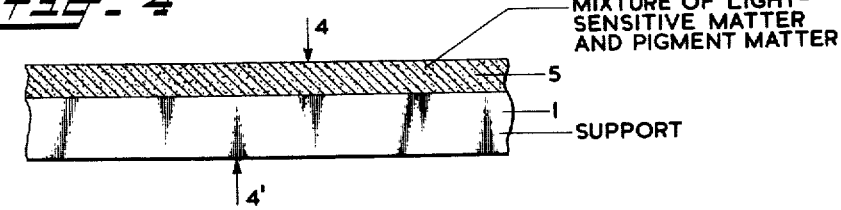
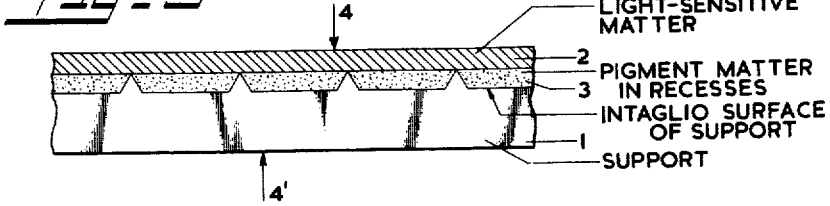
INVENTOR.
WILLEM MARIE BUSKES
BY
ATTORNEY

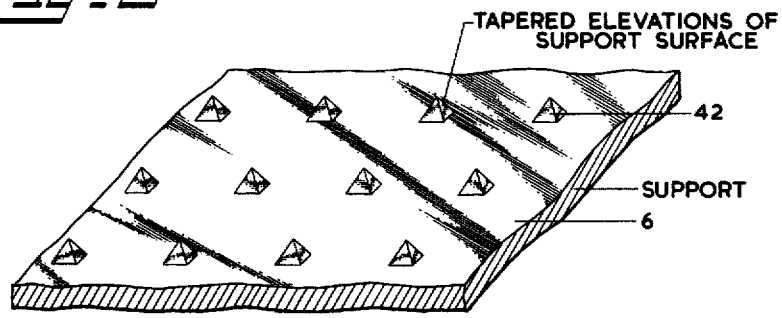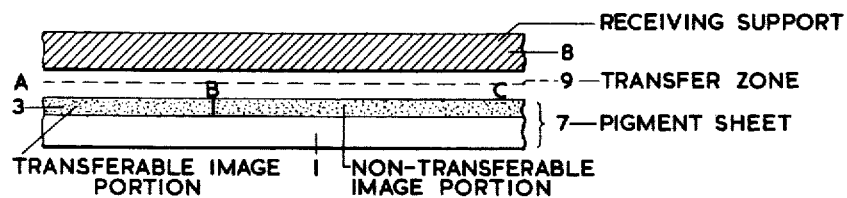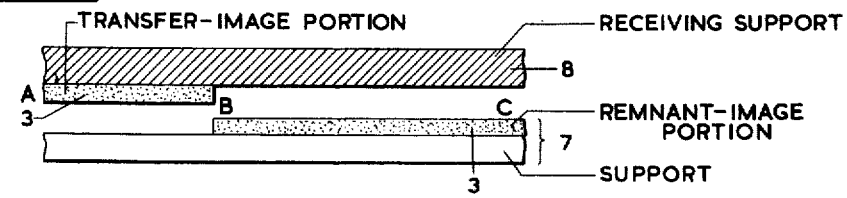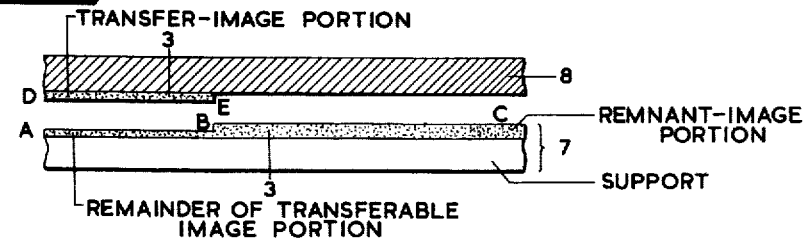

May 28, 1963 W. M. BUSKES 3,091,528
PROCESS AND LIGHT-SENSITIVE SHEETS FOR THE
PRODUCTION OF PIGMENT IMAGES BY TRANSFER
Original Filed March 9, 1953 3 Sheets-Sheet 3
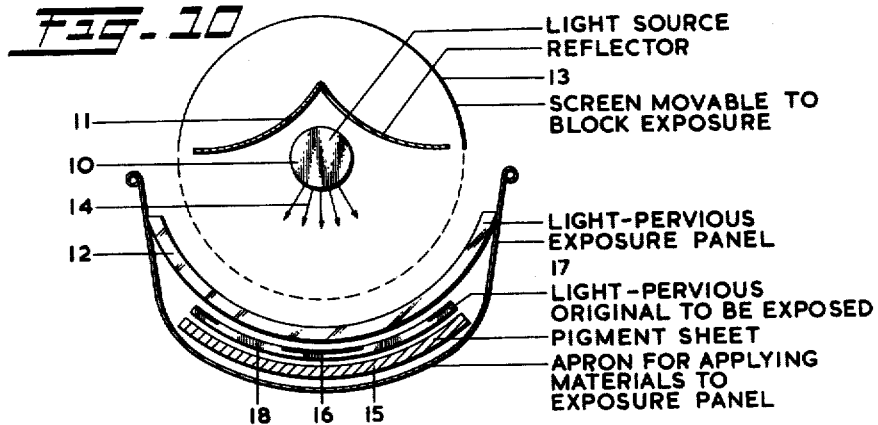
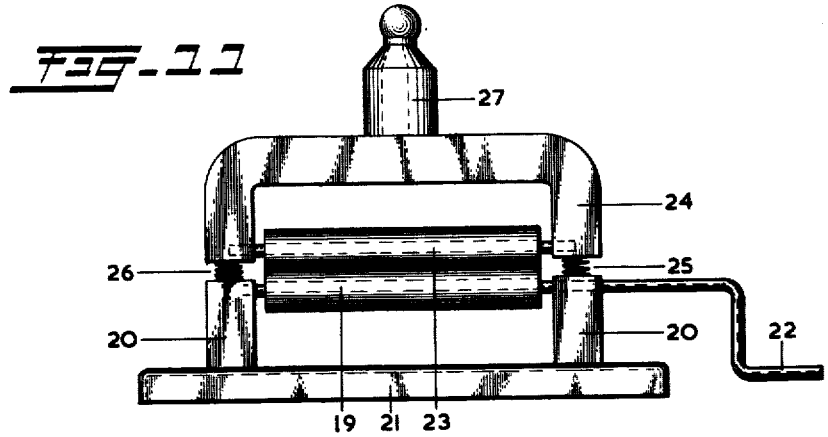
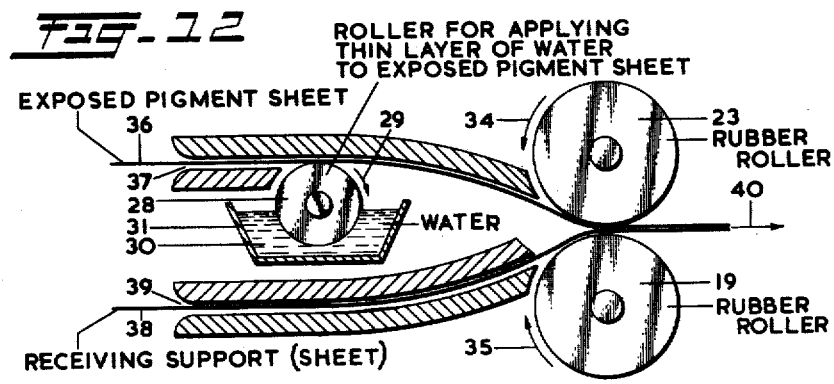
INVENTOR.
WILLEM MARIE BUSKES
BY
ATTORNEY

United States Patent Office 3,091,528
Patented May 28, 1963

3,091,528
PROCESS AND LIGHT-SENSITIVE SHEETS FOR THE PRODUCTION OF PIGMENT IMAGES BY TRANSFER
Willem Marie Buskes, Venlo, Netherlands, assignor, by mesne assignments, to Chemische Fabrik L. van der Grinten N.V., Venlo, Netherlands, a limited-liability company of the Netherlands
Continuation of application Ser. No. 341,198, Mar. 9, 1953. This application Aug. 19, 1958, Ser. No. 756,744
19 Claims. (Cl. 96—28)

This invention relates to a process for the production of a pigment image on a receiving surface, in which process another surface, carrying over its entire area light-sensitive material and pigment matter which contrasts visually with the receiving surface, the light-sensitive material and the pigment matter being linked up with each other, is imagewise exposed and in which the imagewise exposed surface is pressed against the receiving surface to obtain image transfer. The invention also relates to light-sensitive pigment sheets for use in such a process.

This application is a continuation of my co-pending application Serial No. 341,198, filed March 9, 1953, now abandoned.

The process according to the invention has for its purpose the direct production of pigment images (without need for lithographic operations as, for example, etching, inking, etc.) by pigment transfer directly from the surface which carries pigment and light-sensitive material.

Selective transfer processes are known from U.S. Patents No. 1,118,479 and No. 1,618,505 (there called "bodily transfer") and from B.P. 655,274. These transfer methods are isolated disclosures in the literature. On the one hand they are to be distinguished from the decalcomania and the transfer of photographic image layers, e.g. according to British Patents 510,233, 645,211 and 655,275 and "British Journal of Photography," 1928, pages 393–395, and on the other hand from the selective image-transfer by imbibition (diffusion) as described, for example, in British Patent 614,155. The following description relates to direct selective transfer exclusively; for the sake of simplicity, however, it will be referred to as "transfer."

U.S.P. 1,618,505 does not provide or only insufficiently provides data on the composition of the light-sensitive material; the only indication being that as soon as the transfer image is formed on the surface destined for lithography by means of the transferred image portions originating from the light-sensitive material, a lithographic printing surface must be formed by adequate treatment. The process according to B.P. 655,274 is based upon the use of silver halide emulsions.

The present invention has for its object a process which is considerably more simple, cheaper and sometimes quicker; it also may dispense with chemical aftertreatment. Moreover, in certain cases, the invention is found optionally to allow the production of positive or negative transfer images, from one and the same light-sensitive material.

In the process according to the invention there is formed, by imagewise exposure, an image in a surface which carries over its entire area light-sensitive material and pigment matter which contrasts visually with the receiving surface, the light-sensitive material and the pigment matter being linked up with each other; after the exposure, for the purpose of obtaining image transfer, the imagewise exposed surface is pressed against the receiving surface. The light-sensitive material functions in co-operation with the pigment, its function consisting either of "causing the transfer" or of "allowing the transfer" or of "preventing the transfer." Due to the photochemical reaction, it must undergo an alteration, which, upon the transfer-operation, will control the transfer or non transfer of pigment onto the receiving surface in the respective image portions; i.e. it must bring about the necessary differences in the transferability of the pigment in the exposed and the unexposed portions of the pigment sheet respectively.

According to the present invention the light-sensitive material for achieving the above result, is a suitable diazocompound, a suitable azido-styryl-ketone or a suitable azido-styryl-aryl-azide, and the transfer operation is, by means of water, carried out in such a way that in the transferable image portions the pigment is attached to the receiving surface, whilst in the other image portions the pigment remains linked up with the surface originally carrying it together with the light-sensitive material. Thereafter both surfaces are separated from each other. Thus, upon this separation, the receiving surface will carry an image consisting of pigment originating from the surface originally carrying the light-sensitive material and the pigment matter, and this image will hereinafter be referred to as the "transfer image." The image remaining on the surface originally carrying the light-sensitive material and the pigment matter, will hereinafter be refered to as the "remnant image." This latter image will be dependant on the colour of the pigment matter and on that of the carrier, and dependant on possibly incomplete transfer so that it will have, in certain cases, only poor visibility.

The use of water as an auxiliary for the transfer has been suggested above, and its essential function is that of "wetting." However, aqueous solutions, e.g. of salts, wetting-agents or alcohol, which will function like water, are to be understood as comprised by the term "water."

Experiment shows which are the compounds suitable for the process. There are found compounds which give less satisfaction and also some which cannot be used in practice. This, in as much as diazo compounds are concerned, may be illustrated by some data, drawn up for a specific test case, for which Example XX is chosen. When thus using, for the determination of the suitability of a diazo compound, the assembly of pigment sheet and the process according to Example XX as a testing method (in each test the exposure naturally will have to be varied), it is found that p.diazo-ethyl-β-hydroxy-ethyl-aniline, p-diazo-ethyl-beta-diethyl-anime-ethyl-aniline and tetrazo-4.4'-tetra-methoxy-2.2'-5.5'-trihenyl-methane give results which essentially are as good as those obtained with the simple diazocompound of Example XX. By the same test it is found that, for example, tetrazo-diphenyl-amine (Example XXI), p.diazo-monoethyl-aniline and tetrazo-4.4'-dimethoxy-3.3'-diphenyl are less good but still suitable. Poor results are obtained in the test with para-diazo-N-benzyl-diphenylamine, para-diazo-triphenylamine and tetrazo-4.4'-diphenyl. No useful result is given in this test by diazo-1-hydroxy-2-naphthalene sulfonic acid-4 and diazo-2-hydroxy-1-naphthalene sulfonic acid-5.

Naturally, various factors will influence a decision on whether one of these compounds is more or less suitable. When, for example, in Example XXV the transfer-pressure be increased to 3.5 kg. the transfer is no longer selective. When in Example XXVI the treatment with heat is omitted, then likewise selective transfer will no longer be achieved.

Among the particularly suitable diazo compounds are those described in Netherlands Patent No. 35,423. The light-decomposition products of these diazocompounds will precipitate proteins.

In a number of cases (compare also the examples) the conditions hereinbefore formulated for achieving transfer will be fulfilled in the mere presence of the light-sensitive compound (naturally with pigment matter), in particular when the receiving surface carries a hydrophilic binding agent. It has been found, however, that, in general, better results are obtained if the light-sensitive material of the pigment sheets consists of one of the light-sensitive substances according to the invention in addition to a hydrophilic binding agent. Apart from the hydrophilic binding agents commonly used for this sort of purpose, such as gelatin, gum arabic, proteins, and fish glue, there may be used agar-agar, dextrin, casein, gum tragacanth, methyl cellulose, hydrophilic artificial resins, polyvinyl compounds and the like.

For carrying out the transfer either the exposed pigment sheet or the receiving support or both may be immersed in water for some time, and thereafter pressed together. It has been found, however, that in the great majority of cases it is better to apply the water in a quantity of 8–22 g./m.$^2$ transfer-surface to one or both surfaces, in other words to provide one or both surfaces with a thin layer of water. The pressing together then follows after a longer or shorter period of time. In carrying out this process the application of the thin layer of water and the pressing together operation may in many cases advantageously be combined in one single operation. This possibility exists in those cases in which only relatively little time is required between the first contact of one or both of the co-operating surfaces with the thin layer of water and the pressing together operation.

The process according to the invention offers the following possibility:

A pigment matter visually contrasting not only with the receiving surface but also with the surface originally carrying it (and the light-sensitive material), is selected, and in the transfer operation all or nearly all of the pigment available in the transferable image portions is transferred onto the receiving surface. Then upon separating the two surfaces from each other, both will carry a readily visible pigment image, the one (the transfer image) being the subtractive image of the other (the remnant image).

In most cases the pigment matter and the light-sensitive material will in the light-sensitive pigment sheets be located in practice at the surface of a sheet-like support, and for this reason they will, in the following, for the sake of simplicity be referred to as "pigment sheets." The material onto which transfer takes place will be called the "receiving support."

The accompanying drawings will illustrate the invention.

FIGURES 1–5 show schematic cross sections of possibilities for the assembly of the light-sensitive pigment sheets according to the invention.

FIGURE 6 is a perspective view of a particular intaglio-surface.

FIGURES 7–9 show, in schematic cross section, various phases of a transfer-operation.

FIGURE 10 is a schematic cross section of a printing apparatus; FIGURE 11 a front-view of the apparatus for pressing together the exposed pigment sheet and the receiving support and FIGURE 12 is a schematic cross section of an apparatus for the combined moistening and pressing together of sheet and support.

In the drawings identical reference numbers indicate identical parts.

In FIGURE 1, 1 is a (light-pervious) support, 2 the light-sensitive material and 3 the pigment matter. 1, 2 and 3 form one entity, to wit, a light-sensitive pigment sheet for use in the process according to the invention. In the imagewise exposure the light is incident in the direction of arrow 4. If the pigment matter 3 is sufficiently pervious to the light, which is photoactive with respect to the light-sensitive material 2, then optionally the exposure may take place in the direction of arrow 4 or in that of arrow 4'.

The pigment sheet of FIGURE 2 merely differs from that of FIGURE 1 by a different sequence in the assembly of the sheet. With respect to the manner of using this sheet, the same considerations hold as stated above for FIG. 1.

The pigment sheet according to FIGURE 3 is assembled similarly to FIGURE 2; however between support 1 and pigment matter 3 there is provided a sub-layer 41. This sheet is also used as above indicated. If imagewise exposure is to be effected in the direction of arrow 4' the sub-layer 41 also has to be sufficiently pervious to the photo-active light.

With little difficulty sub-layer 41 also can be arranged to be a light-sensitive layer and then, even if the pigment layer is not light-pervious, exposure can optionally be effected in the direction of arrow 4 or arrow 4'. Such a pigment sheet then is, as it were, asesmbled according to the principle of FIGURE 1 as well as according to that of FIGURE 2.

In the pigment sheet of FIGURE 4, 1 is the support and 5 is a mixture of light-sensitive material and pigment matter. When making an exposure the light will (via an original) be incident in the direction of arrow 4, when the support 1 is not, or only little, light-pervious. When support 1 is light-pervious then exposure may optionally be effected in the direction of arrow 4 or that of arrow 4'.

In the pigment sheet of FIGURE 5, 1 is the support, one side of which is provided with an intaglio surface consisting of cavities 6, filled with pigment matter 3. The light-sensitive material is indicated by 2. Upon imagewise exposure the light is incident in the direction of arrow 4. When support 1 and pigment matter 3 are sufficiently pervious to the light which is photoactive with respect to the light-sensitive material 2, then imagewise exposure may optionally be effected in the direction of arrow 4 or in that of arrow 4'.

FIGURE 6 represents, in perspective view, the surface 6 of a support with pyramid-form elevations 42. After filling with pigment matter and super-coating with light-sensitive material a vertical cross section through a row of elevations will appear as in FIGURE 5.

FIGURE 7 represents a pigment sheet 7, which after imagewise exposure and treatment with water is brought into contact with the receiving support 8, the transfer zone being indicated by the dotted line 9. Dotted line 9, for example, can represent a thin layer of water. For clearness' sake the light-sensitive material is not shown, merely the two supports 1 and 8 and the pigment matter 3 being represented in FIGURE 7. The portion A—B of the pigment matter 3 is transferable, and the portion B—C is non-transferable. When sheet 7 and receiving support 8 are separated, then, upon complete transfer, the portion A—B will form, upon the receiving support 8, an image portion of the transfer image as is indicated in FIGURE 8. The portion B—C has remained on the pigment sheet 7 and forms an image portion of the remnant image there.

FIGURE 9 illustrates the situation upon incomplete transfer. In the imagewise exposed pigment sheet 7 there is split off from the portion A—B of the pigment matter 3 the part D—E and this part has transferred to the receiving support 8. The portion B—C, not being transferable, naturally has remained on the original sheet 7. This incomplete transfer nevertheless may have yielded a reasonably good transfer image on receiving support 8, if the part D—E sufficiently contrasts (visually) with the receiving support. However the subtractive remnant image on 7 will be weak.

In the printing apparatus of FIGURE 10, 10 represents a high pressure mercury vapour lamp having, for example, a length of 42 cm. and a wattage of 700; 11 is an aluminium reflector and 12 a segment of a glass cylinder having an outer diameter of, for example, 19 cm. A screen 13 rotatable about its axis (over the trajectory indicated by the dotted line) can screen off the surface to be exposed from the light rays 14.

The pigment sheet 15 to be exposed and the light-pervious original 18 (plus image portion 16) are sandwiched together between the apron 17 and the outer surface of cylinder 12. Thus contact between light-sensitive pigment sheet and original is obtained. When screen 13 is opened exposure takes place from lamp 10 right through cylinder 12.

FIGURE 11 represents a simple apparatus for the pressing together of pigment sheet and receiving support. A rubber roller 19 is held in bearings 20 on the pedestal 21 and is driven by means of crank 22. A rubber roller 23 is held at both ends in frame 24 which is supported at its sides by suitable means (not shown). The springs 25 and 26 neutralise the weight of roller 23 and frame 24. On the top of frame 24 a weight 27 is placed, which weight will control the pressure of roller 23 upon roller 19. The rubber rollers have, for example, a length of 280 mm., a diameter of 40 mm. and a hardness of 75 Shore. By feeding the imagewise-exposed pigment sheet and the receiving support together with water through the rollers 23 and 19, standing under the pressure of weight 27, the pressing together necessary for the transfer is achieved.

FIGURE 12 schematically and in cross section represents a transfer apparatus which combines in one single operation the wetting and the pressing-together of the two surfaces for transfer. Roller 28 rotates according to arrow 29 in the water 30 stored in trough 31. Roller 28 is coupled by suitable means (not shown) with the pressing rollers 23 and 19 (in the same way as described in FIGURE 11 and as in FIGURE 11 standing under pressure), which rotate in the directions of the arrows 34 and 35. This combined apparatus is operated in the following manner:

Pigment sheet 36—image-side downwards—is conducted (via the slot 37 and over the moistening roller 28) to pressing rollers 23 and 19. The trajectory over which sheet 36 travels in moistened condition, i.e. from the point of contact with roller 28 to the point where the pressing together takes place, is 135 mm. long. The pressing rollers 23 and 19 press the wetted pigment sheet 36 and the receiving support 38 (which latter—receiving side upwards—has meanwhile been supplied via slot 39) upon each other, whereafter the two sheets in pressed together condition leave the apparatus in the direction of arrow 40. When in a particular case it is desirable to moisten the receiving support instead of the pigment sheet the situation remains as indicated in FIGURE 12, however with the difference that 36 represents the receiving support—receiving side turned downwards—and 38 the exposed pigment sheet—image-side upwards.

In the foregoing description of the figures it has been stated that in the pigment sheet according to FIGURE 1 the light-sensitive material is situated between support and pigment matter; that in the pigment sheet according to FIGURE 2, the pigment matter lies between support and light-sensitive material and that in the pigment sheet according to FIGURE 3 the pigment matter is situated between the light-sensitive material and a sub-layer. As indicated in FIGURE 4, pigment and light-sensitive material also may, just as in the ordinary pigment paper, be mixed with each other.

Now in the first mentioned case (FIGURE 1), upon the action of light on the light-sensitive material there will come about an alteration in the linkage which pigment matter 3 has with light-sensitive material 2 and/or an alteration in the linkage between the light-sensitive material 2 and the support 1, which alteration in the linkage will become manifest upon the transfer operation (including the treatment with water).

Similarly, in the cases of FIGURES 2, 3 and 5, there will come about an alteration, in the possibility for material 2 plus pigment matter 3 to attach themselves to the receiving support, which alteration will again become manifest upon the transfer operation (including the treatment with water). FIGURE 4 represents an intermediate case in which, according to circumstances, both conditions will hold.

The alterations in the light-sensitive material are generally coupled with, or are generally based upon, an alteration of its receptivity for water and, when it is composed with a hydrophilic binding agent, upon its power to swell with water.

Naturally the composition of the light-sensitive material will to a large extent (and in the first place) determine its differing behaviour in unexposed and in exposed condition. However, is as much as the differences in transferability of the pigment matter, brought about by the differences in the light-sensitive material, are concerned, a number of other factors play a part.

This may now be illustrated by a few examples, although it should be understood that the considerations here raised are of a more or less hypothetical nature.

Assume a pigment sheet of an assembly according to FIGURE 2 be chosen, then the pigment matter 3 therein (which may, for example, be black), will have a given linkage with support 1 (which may, for example, be white). The light-sensitive material 2 may consist of a light-sensitive diazo-fish-glue-layer, soluble in water at room-temperature (according to Example IX). Upon sufficient exposure this layer will lose its solubility, but it may still have, to some extent, the power of absorbing water (swelling power).

When this pigment sheet is imagewise exposed in the direction of arrow 4 and thereafter immersed in water at room-temperature for some time, the unexposed image portions will (by dissolution) loose the diazo-fish-glue-layer, whilst in the exposed image portions this layer will remain and will absorb water and thereby become adhesive. When thereafter, for the purpose of the transfer, the wetted pigment sheet, is pressed (see the illustration of FIGURE 7) with its imagewise-exposed side against a white, non-adhesive receiving support 8, e.g. smooth writing paper, then in the exposed image portions a linkage with the receiving surface will be effected and this means, that in these image portions the pigment matter 3 will be attached to the receiving surface 8. This result will fail to come about in the unexposed image portions in which, as already stated, no more binding agent is available. When the two cooperating surfaces are now separated, as is illustrated in FIGURE 8, the receiving surface will carry an image, consisting of pigment originating from the exposed image portions of the pigment sheet and the transfer image thus formed will be negative. If upon the transfer all or nearly all the pigment transfers in the exposed image portions (compare FIGURE 8) then on the pigment sheet 7 there will remain a positive remnant image.

Assume the operation be carried out in otherwise exactly the same manner, but now so that the pigment sheet is not immersed in water before the transfer-operation, but so that only a small quantity of water is applied between pigment sheet and receiving surface, and this at the very moment of pressing-together, then the results will be different. In the unexposed image portions the diazo-fish-glue-layer will not dissolve in the small quantity of water but will form a moist adhesive mass with it. In the exposed portions, in which the power of the fish-glue-layer to absorb water has been decreased by the exposure, this result will practically fail to come about. The result of the transfer now is that a positive transfer image and a negative remnant image will be formed.

In between these two procedures of transfer, there naturally must exist one (e.g. one in which the moistening of the imagewise exposed pigment sheet is carried out with a larger quantity of water followed shortly thereafter by pressing together with the receiving support) in which neither in the exposed, nor in the unexposed image portions, will pigment transfer onto the receiving surface, or in which everywhere the same quantity of pigment will transfer, in neither of which cases in consequence will an image be formed. The precise point at which the process will just fail to yield an image is difficult to define. In practice it naturally is nevertheless recommendable to avoid the point to a sufficient degree.

It will be clear that, for example, the quality of the fish-glue is an important factor and likewise that quite different effects can come about when the fish-glue is entirely or partially replaced by animal-glue or gelatin. When using diazo-gelatin layers (compare Example III) similar variations of transfer results are likely to occur, now dependent not on the quantity of water used in the transfer, but on the temperature at which the transfer is being carried out. It will also be clear that the properties of the receiving surface will influence the result. When, for example, this surface will very readily absorb water, then under given transfer circumstances image portions in which the binding agent is soluble may sink, as it were, into the receiving surface and thus will no longer be able to contribute to the attaching of pigment matter to the receiving surface. With a receiving surface of a low power of absorbing water, an entirely different result is obtained. By analogy also the support of the pigment sheet and the nature of the pigment matter influence the results.

If a porous pigment layer is mounted over a water absorbent support then, upon moistening, binding agent can sink right through the pigment layer. If the transfer-water is slightly acidified, or rendered alkaline, or if salts or a wetting-agent are added, or if the transfer water is mixed with alcohol or another liquid, then all these circumstances may begin to play their part. The examples will illustrate some of such cases.

An important point in the composition of light-sensitive pigment sheets suitable for the process according to the invention is that the linkage or union between the pigment matter and the support be adequately adjusted. Even if light-sensitive material is located between support and pigment matter, as is indicated in FIGURE 1, or if a sub-layer is located between support and pigment matter, as indicated in FIGURE 3, it should be understood that in the ambit of the invention there is "linkage between pigment matter and support." If this linkage (e.g. in moist condition) is too weak, then upon the transfer with water (after the imagewise exposure) exposed and unexposed image portions may both transfer and if this occurs there will, in consequence, be no question of a selective transfer. If the linkage is too strong, then under certain circumstances, no image portions will be transferred. The said linkage also must be adequately adjusted to the forces of adhesion which the receiving support and the image side of the pigment sheet exert upon each other when cooperating in the transfer under a given wetting and a given transfer-pressure at a given temperature.

Roughly summing up the foregoing considerations, the following cases may be distinguished:

(1) Pigment transfers onto the receiving support in the exposed portions but not in the unexposed portions.
(2) No pigment at all is transferred.
(3) In all portions part of the pigment transfers (everywhere the same amount).
(4) Everywhere all pigment transfers.
(5) Pigment transfers in the unexposed portions but not in the exposed portions.

In practice it has now been found, that, generally speaking, the easiest and most reliable transfer is that of (case 5). For carrying out this method, the composition of the light-sensitive pigment sheet, the manner of moistening, the temperature, the transfer-pressure with which the exposed pigment sheet and the receiving support are pressed together in wetted condition, and the properties of the receiving support, are so chosen that upon separating the pigmented surface from the receiving surface, the pigment from those portions which have remained unexposed, remains attached to the receiving surface, whilst the pigment in the exposed portions remains with the originally light-sensitive pigment sheet.

The process according to the invention is mainly used for the production of transfer and/or remnant images from originals having no medium continuous tones, e.g. originals like line-drawings and half-tone pictures (autotypes). When by means of the process, copies are produced from continuous tone originals, copies will be obtained, in which the rendition of the medium tones will be poor.

According to the process, a multi-colour image may be produced by forming different images on a number of pigment sheets, each carrying a pigment matter of different hue, said images being transferred onto a receiving surface, so as to be superimposed in register.

Many of the compositions for the light-sensitive materials suitable for the process are known per se for photographic and photomechanical processes from Netherlands Patents Nos. 35,423 and 35,480. The condensation products of diazo-compounds with compounds having a reactive carbonyl group yield excellent results in the process according to the invention.

In as much as the construction of the light-sensitive pigment sheets is concerned, reference is made to the following literature: J. M. Eder: "Ausführliches Handbuch der Photographie," vol. IV, 2nd part (1926), describes on page 57 a light-sensitive pigment sheet having a construction corresponding to that of FIGURE 1; German Patent No. 167,752 describes a light-sensitive pigment sheet having a construction corresponding to that of FIGURE 2, whilst light-sensitive pigment sheets, which in their construction correspond to FIGURE 4, are described in detail in Eder, ibid., 2nd part, pages 91–103, in L. P. Clerc, "Ilford Manual of Process Work," 5th edition, page 298, as well as in the extensive literature on intaglio printing techniques. A construction according to FIGURE 3 has not been found in the literature.

Receiving supports may be of different nature. Preferably a support having a surface which is as even as possible is chosen. A example of a good receiving surface is that of glossy coated book paper. Ordinary calendered papers, however, were likewise found to have suitable receiving surfaces, provided of course that the factors influencing the transfer be sufficiently favourable. Likewise transparent papers, films, textile products with a closed surface, glass, rubber and metals are suitable.

Additional adhesives are of use in the transfer, particularly when light-sensitive pigment sheets according to FIGURE 1 are being used. These adhesives may be added to the transfer-water, but they also may be located at the transfer-side of the pigment sheet or at the receiving side of the receiving support, e.g. in the form of a layer which will become adhesive upon moistening.

For adequately controlling the earlier discussed linkage between the pigment matter and its support in the pigment sheets according to the invention, a support is chosen, of which the surface enables even strength of linkage to be obtained at all points of its area.

The transfer being carried out with water, this surface of the support may become wet right through the pigment matter, and in some cases this circumstance will have to be taken into consideration. Thus, for example, at the boundary between support and light-sensitive material plus pigment matter, it is preferable to avoid a situation in which the linkage between support and pigment matter will be strengthened upon moistening. On the contrary a construction of the pigment sheet is preferably chosen in which this linkage will be weakened upon moistening.

Pigment sheets, which, from this point of view, will reliably yield particularly good transfer, are composed with a pigment matter, which is hydrophobic and at the same time porous to water.

Still better transfer will be obtained with these pigment sheets when the surface with which the hydrophobic, to water porous pigment matter is linked up, is hydrophilic. In this case, upon moistening for the purposes of the transfer, the transfer-water can penetrate right through the pigment matter (at any rate in the transferable image portions). It will then wet the surface with which the pigment matter is linked up and thus will there weaken the linkage. This will favour the transfer.

In a suitable embodiment of such pigment sheets, the side of the support with which the hydrophilic and porous pigment matter is linked up consists of completely or partially deacylated cellulose ester. In the pigment sheets according to FIGURES 2 and 5 the surface of support I with which the pigment matter 3 is linked up will, in this case, consist of the (completely or partially) deacylated cellulose ester. In dry condition these pigment sheets may be reasonably resistant against damage upon manipulating, and yet they will, with the aid of water, allow easy and reliable transfer to yield strong transfer images and generally at the same time good remnant images.

Likewise, good results are obtained when the side of the support with which the pigment matter is linked up consists (as in FIGURE 3) of a sub-layer (41) of a hydrophilic binding agent. Upon transfer, with moistening with water (subsequent to the imagewise exposure) the binding agent 41 will—at any rate partially—be transferred together with the pigment matter onto the receiving surface and, after drying, it then will cover up the pigment image and so form a protective layer thereon. The pigment image will thus be more resistant against fingermarking than it would be without the said binding agent.

A number of possible sequences in the assembly of light-sensitive pigment sheets have already been briefly described above, more in particular that in which the pigment matter and the light-sensitive material have the form of separate layers, and that in which the light-sensitive material is then located at that side of the pigment layer, which is remote from the support (FIGS. 2, 3 and 5).

With a reverse assembly (FIGURE 1) the support of the pigment sheet will preferably be light-pervious. The exposure can then be carried out through the support. However, the pigment matter may be chosen so as to be sufficiently pervious to those light rays which are active with respect to the light-sensitive materials and which, nevertheless, make reasonably contrast with the receiving surface. This, for example, may be the case with blue- or violet-coloured pigments or with other pigments, e.g. red or black, when the pigment matter is so composed that it has a reasonably low optical density for the actinic light. Such pigment matter may nevertheless contrast reasonably well with the receiving surface (particularly if viewed by reflection). The light-sensitive pigment sheets according to FIGURES 2, 3 and 5 are preferably exposed in the direction of arrow 4. However, they can also be imagewise exposed through the support, if the pigment matter fulfills the above described requirements of light-perviousness, and if the support is light-pervious. When, however, the remanent image or the transfer image, formed after transfer onto, for example, transparent paper, is to serve for recopying—e.g. in contact printing with light-transmission upon diazotype paper—then the pigment matter will be so chosen that it will have high absorption for the light, which is photoactive on diazo-type paper, and the exposure naturally is again carried out in the direction of arrow 4.

In the assembly according to FIGURES 2, 3 and 5 the light-sensitive material preferably contains a hydrophilic binding agent and has the form of a layer as represented in these figures. With these pigment sheets transfer is generally also possible onto a receiving support with a somewhat rough surface. Such layers of light-sensitive material are preferably of a weight greater than 2 g./m.$^2$. If the process is carried out with a layer of light-sensitive material comprising a hydrophilic binding agent, which layer, according to FIGURES 2, 3 and 5, is located over the pigment matter, then the condition of this layer (exposed or unexposed) will determine the fate of the underlying pigment matter upon transfer, e.g. on wetting and compressing. In those image portions in which the light-sensitive material is, upon transfer, in such condition that it will attach itself to the receiving surface, it will, at any rate if its linkage with the pigment matter is sufficient, attach the pigment matter (or at any rate a part of it) to the receiving support. From the point of view of the transfer-image it is, in most cases, not necessary that all the pigment matter be transferred; the transfer image may nevertheless be satisfactory, particularly if the pigment has a strong visual contrast with the receiving surface.

From the point of view of the quality of the remnant image it is, however, important that as much pigment matter as possible should transfer from the transferable image portions and the quality of an imperfect remnant image can be improved by subjecting the pigment sheet to repeated transfer operations, each time using a fresh suitable receiving support. In doing so, a number of good transfer images may be obtained until the transferable pigment matter available in the pigment sheet, is exhausted.

Numerous organic and inorganic pigments, white, black and of various hues, and under some circumstances also watersoluble pigments, may find useful application in the process according to the invention, e.g. Heliogene Blue B, Lithol Echtscharlach R. N. Pulver, soot or carbon black, graphite, ochre, white lead, baryta, titanium dioxide and iron-oxide. When the pigment is not mixed with a light-sensitive material containing a binding agent, then binding agents such as Syrian asphalt, polymers and cellulose derivatives are used.

From the point of view of technique it may sometimes be difficult to produce an even layer of pigment matter upon a support. These technical difficulties are smaller when the surface carrying the pigment is given an intaglio relief, in which relief the pigment matter is, as it were, lodged (compare FIGURE 5). This also has the effect that the remnant image is more resistant against rubbing, scratching etc., because the pigment matter, forming the remnant image, lies sunk in the intaglio relief. It is advantageous first to form a thin layer of a hydrophilic binding agent, on the intaglio relief, and then to lodge the pigment matter in the surface. The thin layer is so formed that the relief remains—at any rate essentially—intact and thereafter the pigment matter is applied and then the light-sensitive material. Such a light-sensitive pigment sheet will, after imagewise exposure, yield a transfer image, which is in as much as hydrophilic binding agent is transferred, more resistant to finger-marking, whilst the remnant image possesses the advantage already described. The intaglio relief also may be located in a layer of matter overlaying the support and differing from the support proper. It can, for example, consist of a hydrophilic binding agent. When such a binding agent will, in the transferable image portions, entirely or partially transfer together with the pigment, then from such pigment sheets transfer images will be obtained which are more resistant to finger-marking.

A pigment sheet with intaglio relief, offering particularly good transfer possibilities, has the assembly of FIGURE 5. The side of support 1, which carries the pigment matter 3, has the form of a smooth surface 6 with elevations 42 as indicated in FIGURE 6. In FIGURE 6 the elevations have the form of pyramids with a square base. The base, however, can have any other form, preferably that of a circle. Such pigment sheets are resistant against damage upon manipulating, whilst the transfer operation can be carried out particularly easily and reliably. This ease of transfer probably is due to the circumstance that upon pressing together for transfer in an apparatus as illustrated in FIGURE 11, not only vertical but also lateral pressure is exerted, which latter pressure, in co-operation with the (pyramid- or cone-form) elevations promotes the transfer of transferable pigment matter onto the receiving support. It has been found that in pigment sheets of this construction the mutual distance between the tops of the elevations is preferably greater than 20 microns and smaller than 120 microns and their height over the base between 5 microns and 15 microns.

The nature of the images obtained (after the transfer) is dependent on the choice of the pigment and the receiving surface. A good example of the astonishing results which can be achieved by means of the process according to the invention is the following: the pigment layer of the pigment sheet is composed of at least two different layers, the one turned towards the support of the sheet, contrasting visually with the receiving support and the one, turned away from the support, contrasting with the support of the pigment sheet. The pigment layers are so linked up with each other that they can be transferred together. This may be illustrated by an example. A black support is chosen for the pigment sheet. Upon this lies a pigment layer, subdivided into two layers, the lower being black the upper white. Both pigment layers are so linked up with each other that, upon transfer, they are transferred together. Over the white side of the composed pigment layer, light-sensitive material may be located which, in unexposed condition, will on wetting bring about transfer (of the complete double pigment layer), but which in exposed condition will no longer bring about transfer. After imagewise exposure, the transfer operation is carried out on a white receiving support. Thus two images: a transfer image and a remnant image, which are both positive, will be obtained.

The light-sensitive pigment sheets can be manufactured double-sided. The selected support will then be opaque. Both sides can be imagewise exposed and both images can be transferred onto two receiving supports (if desired simultaneously).

One also may form transfer images on both sides of one receiving support.

By far the greatest number of the examples, hereinafter set forth is based upon the use of one and the same diazocompound. These examples serve the purpose of illustrating the various embodiments of the processes and pigment sheets, and by always using the same diazocompound the respective results of the examples are comparable with one another. The diazo-compound chosen is one of the most suitable for the purposes of the invention. Apart from this a few examples utilizing other compositions of light-sensitive material are given. Further, for the sake of brevity, the terms "cellulose acetate sheet" and "gelatin" are used without further indication. By "cellulose acetate sheet" is to be understood a sheet having an acetyl content corresponding to 50% by weight of combined acetic acid, the sheet, if not otherwise indicated, having a weight of 100 g./m.² By "gelatin," without further indication, there is to be understood the type Super Photo JO-5. This "acetate sheet" and this "gelatin" are merely examples of numerous suitable qualities. The examples only use one single quality, of each, for the purpose of making the results better comparable with one another.

The same considerations apply to "carbon black," "asphalt" and "cellulose acetate butyrate." By way of example carbon black of the type Kosmos-20 has always been used; the asphalt used is always of the type Ennjay Oxidized Asphalt 285/300 MP; the cellulose acetate butyrate used is always of the type AB 500/1.

The same considerations apply to the term "transparent paper"; for the reason mentioned, natural transparent paper No. S-1582 Super Transparent of 90 g./m.² is used in each case.

When the examples refer to "diazo aldehyde," this indicates the condensation product of p.-diazodiphenylamine and formaldehyde, prepared according to Example I of Netherlands Patent No. 35,480.

Similarly for the sake of brevity and for better comparison the examples only mention "deacylating" without further indication. This deacylation was carried out as follows:

The cellulose acetate sheet was dipped for 1 second and at a temperature of 28° C. in a solution consisting of:

600 cm.³ ethylalcohol
50 cm.³ water
43 g. potassium hydroxide

Thereafter the sheet was so dried that it became dry in exactly 20 seconds. Then it was again dipped for 1½ seconds at a temperature of 27° C., in the following liquid:

600 cm.³ ethyl alcohol
300 cm.³ water
72 g. potassium hydroxide and it was dried so as to be dry in exactly 10 seconds. The sheet was then washed in running water for 30 seconds and immediately thereafter dipped for 7.5 seconds, at room temperature, in a solution of the following composition:

600 cm.³ ethyl alcohol
3150 cm.³ water
75 g. oxalic acid

Thereafter the sheet was so dried that it became dry in exactly 12 seconds. This is but one of many suitable methods for deacylating. The use of one single type of the materials mentioned and the application of one single method of deacylating in the examples should not be understood in any respect whatsoever as a limitation. This, as will be clear, also applies to the use of the printing apparatus according to FIGURE 10, and for the method of pressing together the exposed light-sensitive sheet with the receiving support, for which manipulation, all the examples use the apparatus according to FIGURE 11 or FIGURE 12.

For the sake of comparability all the examples use the contact printing method with light-transmission. The process, however, is not limited thereto. By reason of the high light-sensitivity of many of the light-sensitive sheets according to the invention, they may also be used for making enlargements, e.g. from microfilms carrying images of printed matter.

*Example I*

On one side of a transparent and colourless sheet of cellulose acetate an even layer of the following solution:

2 g. diazo aldehyde
90 cm.³ water
10 cm.³ ethyl alcohol is applied and dried. The light-sensitive side is now evenly coated by casting with a pigment suspension of the following composition:

240 g. carbon black
48 g. asphalt
1000 cm.³ xylene
200 cm.³ of a solution of 10% by weight of cellulose acetate butyrate whereafter there is dried again.

There is thus formed a hydrophobic, to water porous pigment layer of approximately 0.5 g./m.².

The light-sensitive pigment sheet thus obtained is now exposed for 30 seconds in apparatus according to FIGURE 10. The exposure takes place through a line-drawing in India ink on transparent paper (in the following examples each time referred to as: "the tracing"). The light-sensitive pigment sheet is in close contact with the tracing and the light passes through the cellulose acetate sheet (this one of many suitable exposure methods and in the following examples it will be referred to as: "exposure under the tracing").

In the transfer operation which follows a sheet of transparent paper provided at its receiving surface with a layer of gelatin of approximately 3 g./m.² serves as receiving support.

The transfer is carried out as follows: The receiving support and pigment sheet are both immersed for a few seconds in water at room temperature and thereafter with their transfer sides turned towards each other, they are fed through the apparatus of FIGURE 11 at a speed of 2.5 m. per minute at a transfer-pressure of 2 kg. per lineal centimetre. Immediately thereafter the sheets are separated: the transfer image is a transparent positive and the remnant image is a transparent negative. From the transfer image, positive copies can be produced on diazotype paper and from the remnant image positive copies can be produced on negative photographic materials and on blueprint paper. If not otherwise stated, the transfer operation in the following examples will, as above, be carried out at room temperature.

*Example II*

At one side of a cellulose acetate sheet a pigment layer is formed. This is impregnated superficially with a solution of:

2 g. diazo aldehyde
90 cm.³ water
10 cm.³ ethyl alcohol and dried.

The light-sensitive side of the pigment sheet is exposed for 30 seconds under the tracing. Transparent paper provided with a layer of gelatin of approximately 3 g./m.², which contains 0.2% by weight of chrome alum based on the dry weight of the gelatin, serves as receiving support.

The transfer is carried out as follows: The receiving support is immersed in a mixture of:

1 part by volume ethyl alcohol
3 parts by volume water for a few seconds and thereafter it is fed, together with the pigment sheet, through the apparatus of FIGURE 11, at a speed of 2 m. and a transfer-pressure of 1.75 kg. The sheets are separated; the transfer image is negative and the remnant image is positive. From the latter positive copies on diazotype paper can readily be produced.

If the alum content of the gelatin layer of the receiving support is slightly increased, then the alcohol content of the transfer-water can be decreased. By addition of some alum to the transfer-water less alcohol can be used and a smaller quantity of alum is necessary in the gelatin layer.

*Example III*

A cellulose acetate sheet is deacylated at both sides. At one side of this deacylated cellulose acetate sheet a pigment layer is formed. On the pigment layer there is cast, at 40° C., a solution of:

8 g. gelatin
1 g. diazoaldehyde
100 cm.³ water and the sheet is dried. A light-sensitive layer of 2.5 g./m.² is formed.

The light-sensitive side of the pigment sheet is exposed for 15 seconds under the tracing.

Woodpulp-free glossy coated book paper serves as receiving support.

The transfer is carried out as follows:

The pigment sheet is immersed in water for a few seconds and thereafter it is fed together with the receiving support, through the apparatus of FIGURE 11 at a speed of 2.75 m. and a transfer-pressure of 2.5 kg. The sheets are separated; the transfer image is positive and the remnant image is negative.

If upon the transfer the exposed pigment sheet is immersed for 30 seconds in water at approximately 35° C. and immediately thereafter fed through the apparatus of FIGURE 11 together with the receiving support, then after separating the sheets a negative transfer image and a positive remnant image are obtained. Both remnant images are suitable for recopying contact-printing with light-transmission.

*Example IV*

At one side of a sheet of transparent paper there is cast a solution of:

10 g. gum arabic
85 cm.³ water
15 cm.³ ethyl-alcohol and the sheet is dried. A gum layer of approximately 1.5 g./m.² is formed. Upon this layer a pigment layer is formed. On the pigment layer there is cast at 40° C. a solution of:

4 g. gelatin
2 g. diazo aldehyde
100 cm.³ water and the sheet is dried. A light-sensitive layer of approximately 2 g./m.² is formed. The light-sensitive side of the pigment sheet is exposed under the tracing for 18 seconds. White smooth writing paper serves as receiving support.

The transfer is carried out as follows: The pigment sheet is immersed in water for a few seconds and thereafter it is fed, together with the receiving support, through the apparatus of FIGURE 11 at a speed of 2 m. and a transfer-pressure of 2.25 kg. The sheets are separated; the transfer-image is positive and, after drying, highly resistant to finger-marking, and the remnant image is a transparent negative.

*Example V*

At one side of a cellulose acetate sheet there is cast at 40° C. a solution of:

4 g. gelatin
1 g. diazo aldehyde
100 cm.³ water and the sheet is dried. A diazo gelatin layer of approximately 1.5 g./m.² is formed. On this layer a pigment layer is formed. On the pigment layer there is cast at 40° C. a diazo gelatin solution of the same composition as above and the sheet is dried. A light-sensitive layer of approximately 2 g./m.² is formed.

The pigment sheet is exposed under the tracing for 17 seconds through the cellulose acetate sheet. Smooth white writing paper serves as receiving support.

The transfer is carried out as follows: The apparatus according to FIGURE 12 is put in motion. The transfer liquid in trough 31 is water. The sheet indicated at 36 is the exposed pigment sheet, pigment side downwards and sheet 38 is the receiving support. The apparatus is operated at a speed of 2 m. and a transfer-pressure of 2.5 kg. The quantity of water which roller 28 supplies to sheet 36 is approximately 12 g./m.². The sheets are separated.

The transfer image is positive and, after drying, it is highly resistant to finger-marking. After having been exposed to daylight for some time the transfer image will become still more resistant to finger-marking and the action of moisture. The remnant image is negative. The exposure under the tracing also can be carried out from the other side of the pigment sheet and, upon the same transfer operation, analogous results are obtained.

*Example VI*

At one side of a deacylated cellulose acetate sheet there is cast a pigment suspension of the following composition:

12 g. carbon black
5.5 g. diazo aldehyde
10 cm.³ ethyl alcohol
90 cm.³ water and the sheet is dried. The pigment sheet is exposed under the tracing for 30 seconds. The exposure can optionally be carried out upon either side. Transparent paper, provided with a layer of gelatin of 3 g./m.², serves as receiving support.

The transfer is carried out as follows: The exposed pigment sheet and the receiving support are both immersed in water for a few seconds and thereafter, they are fed through the apparatus of FIGURE 11 in contact with each other, at a speed of 2 m. and a transfer pressure of 1.75 kg. The sheets are separated; the transfer image is positive and the remnant image is a transparent negative.

*Example VII*

In one side of a cellulose acetate sheet a relief is pressed, consisting of evenly distributed cupules adjoining each other, which each per se have the form of a reversed pyramid with a square base (upper plane). The linear distance from cupule to cupule is 120 microns and their depth is 40 microns. The cellulose acetate sheet is deacylated and the relief is then entirely filled with pigment matter. Upon the relief thus filled there is cast at 40° C. a solution of:

8 g. gelatin
1 g. diazo aldehyde
100 cm.³ water and the sheet is dried. A light-sensitive layer of approximately 2.5 g./m.² is formed. The light-sensitive side of the pigment-sheet is exposed under the tracing for 15 seconds. White woodpulp-free glossy coated bookpaper serves as receiving support.

The transfer is carried out as follows: The exposed pigment sheet is immersed in water for a few seconds and thereafter it is fed, together with the receiving support, through the apparatus of FIGURE 11 at a speed of 2.75 m. and a transfer pressure of 2.5 kg. The sheets are separated; the transfer image is positive. The transfer, however, is incomplete, with the result that the remnant image only shows a very weak negative image.

*Example VIII*

At one side of a cellulose acetate sheet a relief is pressed as shown in the FIGURES 5 and 6. The shortest distance between the tops of the pyramids is 130 microns, their height is 12 microns and their top-angle measured in the plane through top and diagonal of base is approximately 90°. The cellulose-acetate sheet is deacylated and there is then cast upon the relief a suspension of:

200 g. carbon black
20 g. cellulose acetate butyrate
1500 cm.³ ethyl acetate and the sheet is dried. The operation is carried out so that, after drying, the relief is filled with pigment matter. Upon the pigment there is cast at 40° C. a solution of:

8 g. gelatin
1 g. diazo aldehyde
100 cm.³ water and the sheet is dried. A light-sensitive layer of approximately 2.5 g. per m.² is formed. The light-sensitive side of the pigment sheet is exposed under the tracing for 30 seconds. Smooth white writing paper serves as receiving support.

The transfer is carried out as follows: The apparatus according to FIGURE 12 is put in motion. The transfer-liquid in trough 31 is water. The sheet indicated at 36 is the exposed pigment sheet, pigment side downwards, and sheet 38 the receiving support. The apparatus is operated at a speed of 2 m. and a transfer-pressure of 2.5 kg. The quantity of water which roller 28 supplies to sheet 36 is approximately 12 g./m.². The sheets are separated. The transfer-image is positive and the remnant image is a transparent negative highly resistant to fingermarking. Instead of writing paper there may be used, for example, thin metal sheets, such as aluminium foil and, in particular, metallized papers for example paper which is provided with a thin matt aluminium layer.

*Example IX*

In one side of a cellulose acetate sheet a relief is pressed as shown in FIGURES 5 and 6. The shortest distance between the tops of the pyramids is 80 microns, their height is 10 microns and their top angle measured in the plane through top and diagonal of base is approximately 90°. The cellulose acetate sheet is deacylated and there is then cast upon the relief a suspension of:

240 g. carbon black
48 g. asphalt
1000 cm.³ xylene
200 cm.³ of a solution of 10% by weight of cellulose acetate butyrate in ethyl acetate and the sheet is dried. The operation is so carried out that, after drying, the relief is filled up with pigment matter. On the pigment there is cast at 30° C. a solution of:

25 cm.³ Le Page fish glue
1 g. diazo aldehyde
75 cm.³ water and the sheet is dried. A light-sensitive layer of approximately 2 g./m.² is formed. The light-sensitive side of the pigment sheet is exposed under the tracing for 20 seconds. Woodpulp-free white, glossy coated book paper serves as receiving support.

The transfer is carried out as follows: The pigment sheet is immersed in water for 10 seconds and thereafter it is fed, together with the receiving support, through the apparatus of FIGURE 11 at a speed of 2 m. and a transfer-pressure of 2 kg. The sheets are separated; the transfer image is negative and the remnant image is a transparent positive, highly resistant to finger-marking.

*Example X*

In one side of a cellulose acetate sheet a relief is pressed as shown in FIGURES 5 and 6, however, with cones instead of pyramids. The shortest distance between the tops of the cones is 40 microns; their height is 8 microns and their top-angle is approximately 60°. The cellulose acetate sheet is deacylated and there is then cast upon the relief a suspension of:

10 g. Heliogene Blue B
0.5 g. cellulose acetate butyrate
100 cm.³ ethyl acetate and the sheet is dried. The operation is carried out so after drying the relief is filled with pigment matter. On the pigment there is cast at 40° C. a solution of:

8 g. gelatin
1 g. diazo aldehyde
100 cm.³ water and the sheet is dried. A light-sensitive layer of approximately 2 g./m.² is formed. A light-sensitive side of the pigment sheet is exposed under the tracing for 15 seconds. Smooth white writing paper serves as receiving support.

The transfer is carried out as follows: The exposed pigment sheet is immersed in water for a few seconds and thereafter it is fed, together with the receiving support, through the apparatus of FIGURE 11 at a speed of 2.5 m. and a transfer-pressure of 2 kg. The sheets are separated; the transfer image is positive and the remnant image is a transparent negative.

If the exposure of the light-sensitive pigment sheet under the tracing is effected at the non-light-sensitive side, i.e. through the cellulose acetate sheet and the pigment matter, then the exposure will take 20 seconds. Receiving support and transfer method can be the same as described above. By the method of this example one also can readily transfer onto glass, ceramic surfaces and the like and also upon metal sheets, the latter then serving for the production of templates.

*Example XI*

Four cellulose acetate sheets of 300 g./m.$^2$ are provided with a relief as in Example IX, deacylated, cast with pigment suspension and dried, so that the relief is filled with pigment matter after the drying operation. For the first sheet the following suspension is used:

5.8 g. carbon black
0.6 g. cellulose acetate butyrate
100 cm.$^3$ ethyl acetate for the second sheet:

8.5 g. Hansa Yellow 10 G
2 g. cellulose acetate butyrate
100 cm.$^3$ ethyl acetate;

for the third sheet:

8.5 g. Lithol Echtscharlach R. N. Pulver
2 g. cellulose acetate butyrate
100 cm.$^3$ ethyl acetate for the fourth sheet:

10 g. Heliogene Blue B
5 g. cellulose acetate butyrate
100 cm.$^3$ ethyl acetate Upon all the sheets there is cast, at 40° C., a solution of:

5 g. gelatin
1 g. magnesium sulphate
1 g. diazoaldehyde
100 cm.$^3$ water and the sheets are dried. The operations are carried out so that upon each of the sheets a light-sensitive layer of approximately 2.5 g./m.$^2$ is formed. A multicolour line drawing is taken, for example representing a groundplan in which black lines indicate walls, yellow lines gas pipes, red lines the dimensions and blue lines the waterpipes. From this drawing there are made in register four Indian ink tracings of exactly the same size as that of the multicolour drawing, the first showing the black, the second the yellow, the third the red and the fourth the blue image portions. The four pigment sheets are likewise made exactly the size of the multicolour line drawing. The light-sensitive side of the first pigment sheet is now exposed in register under the first tracing for 30 seconds, the second likewise under the second tracing, the third under the third tracing and the fourth under the fourth tracing.

A sheet of white, woodpulp-free glossy coated book paper of exactly the same size as that of the multicolour drawing serves as receiving support and upon it there is transferred the image of the first pigment sheet by immersing the latter for a few seconds in water and thereafter contacting it exactly in register with the receiving support and feeding through the apparatus of FIGURE 11 at a speed of 2 m. and a transfer-pressure of 2.25 kg. The sheets are separated; the transfer image is a positive black image of the first tracing. The transfer image is dried in a lukewarm air current and it is used, again in register for the same transfer-operation, but now from the second pigment sheet. It is again dried and upon it the third and fourth transfer is carried out in the same manner, now using respectively the third and fourth pigment sheet. Finally a true multicolour image of the original multicolour line drawing is obtained on the receiving support.

*Example XII*

At one side of smooth black paper there is cast at 40° C. a solution of:

30 g. gum arabic
100 cm.$^3$ water and dried. A gum layer of 2 g./m.$^2$ is formed. On this there is formed a pigment layer (black). Over this black pigment layer there is mounted a second, different, pigment layer as follows:

A suspension is formed of:

10 g. Lithol Echtscharlach R. N. Pulver
1 g. cellulose acetate butyrate
100 cm.$^3$ ethyl acetate and this is cast upon the first (black) suspension and dried, so, that the black pigment is well covered and seen from the outside the pigment surface consequently is clear red. Upon this red pigment layer there is cast, at 40° C., a solution of:

4 g. gelatin
2 g. diazo aldehyde
100 cm.$^3$ water and the sheet is dried. A light-sensitive layer of approximately 2.5 g./m.$^2$ is formed. The light-sensitive side of the pigment sheet is exposed under the tracing for 18 seconds. A clear red sheet of paper serves as receiving support.

The transfer is carried out as follows: The pigment sheet is immersed in water for 10 seconds and thereafter it is fed, together with the receiving support, through the apparatus of FIGURE 11 at a speed of 2.5 m. and a transfer pressure of 2 kg. The sheets are separated; the transfer image is positive in black on clear red; the remnant image is likewise a black positive on a clear red background. The images are thus both positive, although they represent each other's reversed image.

*Example XIII*

In one side of a cellulose acetate sheet a relief is pressed as in Example IX. Upon the relief there is cast a suspension of:

4 g. gum arabic
1.25 g. gelatin
5 g. Lithol Echtscharlach R. N. Pulver
2.5 cm.$^3$ glycerol
2.5 g. diazo aldehyde
100 cm.$^3$ water and the sheet is dried. The operation is carried out so that, after drying, the relief is filled with hydrophilic pigment matter. The pigment side of the pigment sheet is exposed under the tracing for 18 seconds. Woodpulp-free, white, glossy coated book paper serves as receiving support.

The transfer is carried out as follows: The apparatus according to FIGURE 12 is put in motion. The transfer-liquid in trough 31 is water. The sheet indicated at 36 is the receiving support and sheet 38 is the exposed pigment sheet, pigment side upwards. The apparatus is operated at a speed of 1.5 m. and a transfer pressure of 2 kg. The sheets are separated. The transfer image is a red positive and the remnant image is a red negative. The exposure under the tracing also can be effected on the other side of the pigment sheet and the transfer then can take place in the same manner and the same transfer- and remnant-images will be produced.

If in the above given suspension the 5 g. Lithol Echtscharlach R. N. Pulver are substituted by 0.2 g. crystal violet and if the operation is otherwise carried out in the same manner then, upon transfer, a positive transfer image of a greenish colour is obtained, the colour of which will, upon short exposure to daylight, shift to blue.

The transfer can be repeated several times, each time upon a fresh receiving support, until the transferable pigment available in the pigment sheet is exhausted. The remnant image is a transparent negative.

*Example XIV*

In one side of a cellulose acetate sheet a relief is pressed as in Example IX. The cellulose acetate sheet is deacylated and on the relief there is cast a suspension of:

4 g. gum arabic
5 g. Lithol Echtscharlach R. N. Pulver
1.25 g. gelatin
2.5 cm.$^3$ glycerol
100 cm.$^3$ water and the sheet is dried. The operation is carried out so that, after drying, the relief is filled with hydrophilic pigment matter. The pigment is now superficially impregnated at 25° C. with a solution of:

2 g. diazoaldehyde in
50 gm.$^3$ water and
50 cm.$^3$ ethyl alcohol

The light-sensitive side of the pigment is exposed under the tracing for 18 seconds. Woodpulp-free, white, glossy, coated book paper serves as receiving support.

The transfer is carried out as in Example XIII. The transfer image is a red positive and the remnant image a red negative.

*Example XV*

In one side of a cellulose acetate sheet a relief is pressed as in Example IX. The cellulose acetate is deacylated and there is then cast upon the relief a suspension of:

240 g. carbon black
48 g. asphalt
1000 cm.$^3$ xylene
1000 cm.$^3$ of a solution of 10% by weight of cellulose acetate butyrate in ethyl acetate and the sheet is dried. The operation is carried out so that, after drying, the relief is filled with a hydrophobic pigment matter. On the pigment there is cast at 40° C. a solution of:

4 g. gelatin
1 g. diazo aldehyde
100 cm.$^3$ water and the sheet is dried. A light-sensitive layer of approximately 2 g./m.$^2$ is formed. The light-sensitive side of the pigment sheet is exposed under the tracing for 20 seconds.

The transfer is carried out as follows: The pigment sheet is immersed in water for 15 seconds and thereafter it is fed, together with the receiving support, through the apparatus of FIGURE 11 at a speed of 1.5 m. and a transfer pressure of 2.25 kg. The sheets are separated; the transfer image is positive and the remnant image is a transparent negative. The transfer image is highly resistant to finger-marking and to moistening with water. The process, as described in this example, however, has the drawback that the moistening takes relatively much time and that transfer takes place at a low speed. Transfer in the combined apparatus of FIGURE 12 would, in the process of this example, cause difficulties.

*Example XVI*

A cellulose acetate sheet is finely matted at one side and deacylated. Onto the matted side there is cast the following solution:

10 g. gum arabic
10 g. carbon black
5 g. diazo aldehyde
5 cm.$^3$ glycerol
100 cm.$^3$ water and the sheet is dried. A light-sensitive pigment layer of approximately 5 g./m.$^2$ is formed. The pigment side of the pigment sheet is exposed under the tracing for 30 seconds. The transfer is carried out as in Example XIII at a speed of 2.5 m. and a transfer pressure of 1 kg. Woodpulp-free, white, glossy, coated book paper serves as receiving support. The sheets are separated. The transfer image is positive. The remnant image is practically invisible. The pigment sheet is now again submitted to the same transfer operation, again upon the same paper. A new positive transfer image is formed and the remnant image is still nearly invisible. The transfer operation is repeated each time from the same pigment sheet and each time upon a fresh receiving support. A number of positive transfer images is obtained and the visibility of the negative remnant image each time improves. The operation is repeated until the transfer images begin to become of insufficient strength.

*Example XVII*

In one side of a cellulose acetate sheet a relief is pressed as in Example X. Upon the relief there is cast a solution of:

10 g. gum arabic
85 cm.$^3$ water
50 cm.$^3$ ethyl alcohol and the sheet is dried. The gum layer weighs approximately 1 g./m.$^2$. The upper side of the gum layer essentially shows the same relief as the cellulose acetate sheet. Upon this relief there is cast a suspension of:

5.8 g. carbon black
0.6 g. cellulose acetate butyrate
100 cm.$^3$ ethyl acetate and the sheet is dried. The operation is carried out so that, after drying, the relief is filled with pigment matter. Upon the pigment layer there is cast at 40° C. a solution of:

4 g. gelatin
2 g. diazo aldehyde
100 cm.$^3$ water and the sheet is dried. A light-sensitive layer of approximately 2 g./m.$^2$ is formed. The light-sensitive side of the pigment sheet is exposed under the tracing for 18 seconds. White smooth writing paper serves as receiving support.

The transfer is carried out as follows: The pigment sheet is immersed in water for a few seconds and thereafter it is fed, together with the receiving support, through the apparatus of FIGURE 11 at a speed of 2 m. and a transfer pressure of 2.5 kg. The sheets are separated; the transfer image is positive and, after drying, highly resistant to finger-marking; the remnant image is negative.

*Example XVIII*

A cellulose acetate sheet is provided with a relief, and it is deacylated. A pigment suspension is cast upon it as in Example IX. On the pigment there is cast, at 30° C., a solution of:

15 g. gum arabic
0.5 g. diazo aldehyde
100 cm.$^3$ water and the sheet is dried. A light-sensitive layer of approximately 2 g./m.$^2$ is formed. The light-sensitive side of the pigment sheet is exposed under the tracing for 30 seconds. Woodpulp-free, white, glossy coated book paper serves as receiving support.

The transfer is carried out as follows: The pigment sheet is immersed in water for a few seconds and thereafter it is fed, together with the receiving support, through the apparatus of FIGURE 11 at a speed of 2 m. and a transfer pressure of 2.25 kg. The pressed together sheets are completely dried at room temperature. Thereafter they are separated; the transfer image is negative and the remnant image is a transparent positive which can be re-copied on diazotype material. Alternative procedures can be followed:

(a) For the sensitizing there is used a weakly ammoniacal solution of 40° C. of:

12 g. casein in
100 cm.³ water to which, after cooling down to 40° C., there has been added 2 cm.³ ethyl alcohol. After drying, the layer is superficially sensitized with a solution of:

2 g. diazoaldehyde
20 cm.³ water
80 cm.³ ethyl alcohol whereafter it is again dried. The further operation is carried out as above and the transfer is carried out upon white, woodpulp-free, glossy coated book paper as follows:

The apparatus according to FIGURE 12 is put in motion. The transfer liquid is water. The apparatus is operated at a speed of 3.5 m. and a transfer pressure of 2.5 kg. The sheet indicated at 36 is the exposed pigment sheet, pigment side downwards and sheet 38 is the receiving support. The quantity of water which roller 28 supplies to sheet 36 is 10–12 g./m.². The sheets are separated. The transfer image is positive and the remnant image is negative.

(b) For sensitizing, a solution, at 40° C. of 1.25 g. of an incompletely deacylated polyvinyl acetate of the type Elvanol (grade 20–105) 43–50% deacylated of Du Pont de Nemours & Co., Wilmington, Del., U.S.A.)
50 cm.³ water
50 cm.³ ethyl alcohol
1 g. diazo aldehyde is used and the operations are further carried out as above.

The transfer is carried out upon transparent paper as follows: The pigment sheet is immersed in water for a few seconds and thereafter it is fed, together with the receiving support, through the apparatus of FIGURE 11 at a speed of 2 m. and a transfer pressure of 2 kg. The sheets are separated; the transfer image is a transparent positive and the remnant image is a transparent negative; both can be re-copied.

(c) For sensitizing, there is used a solution, at 25° C., of:

10 g. blood albumin
100 cm.³ water which after drying is superficially impregnated with a solution of:

2 g. diazoaldehyde
20 cm.³ water
80 cm.³ ethyl alcohol whereafter it is dried again. The operations are further carried out as above.

The transfer upon white, woodpulp-free, glossy coated book paper is carried out as follows:

The pigment sheet is immersed in water for a few seconds and thereafter it is fed, together with the receiving support, through the apparatus of FIGURE 11 at a speed of 2.5 m. and a transfer pressure of 2 kg. The sheets are separated; the transfer image is positive and the remnant image is a transparent negative.

(d) For sensitizing, there is used a solution, at 40° C., of:

10 g. dextrin
1 g. diazo aldehyde
100 cm.³ water and the operations are further carried out as above.

The transfer upon white, woodpulp-free, glossy coated book paper is carried out as follows: The pigment sheet is immersed in a mixture of:

1 part by volume of ethyl alcohol with
3 parts by volume of water for a few seconds and thereafter it is fed, together with the receiving support, through the apparatus of FIGURE 11 at a speed of 2 m. and a transferpressure of 2 kg. The sheets are separated; the transfer image is negative and the remnant image is a transparent positive.

*Example XIX*

A cellulose acetate sheet is provided with a relief, deacylated and a pigment suspension is cast thereon and dried, as in Example IX. On the pigment there is cast, at 40° C., a solution of:

6 g. gelatin
1 g. 4-4'-diazido-stilbene-disulphonicacid-2-2'
100 cm.³ water and the sheet is dried. A light-sensitive layer of approximately 2.5 g./m.² is formed. The light-sensitive side of the pigment sheet is exposed under the tracing for 40 seconds. White smooth writing paper serves as receiving support.

The transfer is carried out as follows: The pigment sheet is immersed in water for a few seconds and thereafter it is fed, together with the receiving support, through the apparatus of FIGURE 11 at a speed of 2.5 m. and a transfer pressure of 2 kg. The sheets are separated; the transfer image is positive, and the remnant image is a transparent negative.

*Example XX*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. of the borofluoride of para-diazo-aniline
100 cm.³ water and dried again. A light-sensitive layer of approximately 2 g./m.² is thus formed. The light-sensitive side of the pigment sheet is exposed for 120 seconds under the tracing. White smooth writing paper serves as receiving support.

The transfer is carried out as follows: The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

*Example XXI*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. of the chlorostannate of 4-4'-tetrazodiphenylamine
100 cm.³ water and dried again. A light-sensitive layer of approximately 2 g./m.² is thus formed. The light-sensitive side of the pigment sheet is exposed for 60 seconds under the tracing. White smooth writing paper serves as receiving support.

The transfer is carried out as follows: The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

*Example XXII*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. para-diazo-mono-ethylaniline
100 cm.³ water and dried again. A light-sensitive layer of approximately 2 g./m.² is thus formed. The light-sensitive side of the pigment sheet is exposed for 75 seconds under the tracing. White smooth writing paper serves as receiving support.

The transfer is carried out as follows: The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

*Example XXIII*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. para-diazo-ethyl-betahydroxyethyl-aniline
100 cm.³ water and dried again. A light-sensitive layer of approximately 2 g./m.² is thus formed. The light-sensitive side of the pigment sheet is exposed for 60 seconds under the tracing. White smooth writing paper serves as receiving support.

The transfer is carried out as follows: The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

*Example XXIV*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. para diazo-ethyl-betadiethylaminoethyl-aniline
100 cm.³ water and dried again. A light-sensitive layer of approximately 2 g./m.² is thus formed. The light-sensitive side of the pigment sheet is exposed for 45 seconds under the tracing. White smooth writing paper serves as receiving support.

The transfer is carried out as follows:
The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

*Example XXV*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. tetrazo - 4 - 4' - tetramethoxy - 2 - 2' - 5 - 5' - triphenylmethane
100 cm.³ water and dried again. A light-sensitive layer of approximately 2 g./m.² is thus formed. The light-sensitive side of the pigment sheet is exposed for 60 seconds under the tracing. White smooth writing paper serves as receiving support.

The transfer is carried out as follows: The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

*Example XXVI*

A cellulose acetate sheet is provided with a relief, it is deacylated, pigment suspension is cast upon it and dried as in Example VIII. On the pigment side there is cast, at 40° C., a solution of:

8 g. gelatin
100 cm.³ water

This is dried and thereafter sensitized at a temperature of 20° C. with a solution of:

2 g. para diazo mono-cyclohexylaniline
100 cm.³ water and dried again. A light-sensitive layer of approximately 2 g./m.² is formed. The light-sensitive side of the pigment sheet is exposed for 120 seconds under the tracing. Thereafter the pigment sheet is exposed for 10 minutes at a temperature of 80° C. and thereafter it is cooled to room temperature. White smooth writing paper serves as receiving support.

The transfer is carried out as follows: The apparatus according to FIGURE 12 is put in motion. The transfer liquid is distilled water at 19° C. The apparatus is operated at a speed of 3 m. and a transfer pressure of 1 kg. The sheet indicated at 36 is the pigment sheet, pigment side downwards and sheet 38 is the receiving support. The quantity of water which roller 28 supplies to sheet 36 is approximately 20 g./m.². The sheets are separated. The transfer image is positive and the remnant image is a transparent negative.

What I claim is:

1. A photographic process for the production of a pigment image on a receiving surface, which comprises imagewise exposing to actinic light a sheet comprising a support carrying adherently but transferably over only one of its sides a composite structure consisting essentially of visually perceptible pigment matter linked to a sensitive organic colloid material containing a compound which upon exposure to actinic light materially alters an adhesion power possessed by said material upon a wetting thereof, said compound being selected from the group consisting of light-sensitive diazo compounds and light-sensitive azido compounds, at least pigment matter containing parts of said structure being adherable to said receiving surface with a strength greater than that of their adherence to other parts of the sheet, and thus being transferable bodily from said support to said receiving surface, by a wetting of said structure followed by a pressing of said receiving surface against the outer surface of said structure and a separation of said receiving surface from said outer surface; by said exposing subjecting said material imagewise to said light until said light has divided said structure imagewise into two distinct groups of latent image portions respectively lying in the exposed and the relatively unexposed areas of said structure and so differing in their adhesion powers that the image portions of one of said groups, including at least in part the portions of said pigment matter located in the corresponding areas of said structures, are selectively adherable to said receiving surface, and selectively transferable, as aforesaid; after said exposing wetting said structure and rendering pigment matter containing parts of one only of said groups of latent image portions more adhesive to said receiving surface than to the other parts of said sheet; then pressing said receiving surface against said outer surface; and thereafter separating said receiving surface from said outer surface and thereby selectively severing and transferring from the other parts of said sheet at least parts of said one group of image portions, including at least in part the portions of said pigment matter located inthe corresponding areas of said structure, in the form of a pigment image obtained in adherence to said receiving surface without further development.

2. A photographic process for the production of a pigment image on a receiving surface, which comprises imagewise exposing to actinic light a sheet comprising a support carrying adherently but transferably over only one of its sides a composite structure consisting essentially of visually perceptible pigment matter linked to a sensitive organic colloid material comprising a condensation product of formaldehyde and a p-diazo-diphenylamine, at least pigment matter containing parts of said structure being adherable to said receiving surface with a strength greater than that of their adherence to other parts of the sheet, and thus being transferable bodily from said support to said receiving surface, by a wetting of said structure followed by a pressing of said receiving surface against the outer surface of said structure and a separation of said receiving surface from said outer surface; by said exposing subjecting said material imagewise to said light until said light has divided said structure imagewise into two distinct groups of latent image portions respectively lying in the exposed and the relatively unexposed areas of said structure and so differing in their adhesion powers that the image portions of one of said groups, including at least in part the portions of said pigment matter located in the corresponding areas of said structure, are selectively adherable to said receiving surface, and selectively transferable, as aforesaid, after said exposing wetting said structure and rendering pigment matter containing parts of one only of said groups of latent image portions more adhesive to said receiving surface than to the other parts of said sheet; then pressing said receiving surface against said outer surface; and thereafter separating said receiving surface from said outer surface and thereby selectively severing and transferring from the other parts of said sheet at least parts of said one group of image portions, including at least in part the portions of said pigment matter located in the corresponding areas of said structure, in the form of a pigment image obtained in adherence to said receiving surface without further development.

3. A photographic process for the production of a pigment image on a receiving surface, which comprises imagewise exposing to actinic light a sheet comprising a support carrying adherently but transferably over only one of its sides a composite structure consisting essentially of visibly perceptible pigment matter linked to a sensitive organic colloid material comprising 4,4'-diazido-stilbene disulphonic acid-2,2', at least pigment matter containing parts of said structure being adherable to said receiving surface with a strength greater than that of their adherence to other parts of the sheet, and thus being transferable bodily from said support to said receiving surface, by a wetting of said structure followed by a pressing of said receiving surface against the outer surface of said structure and a separation of said receiving surface from said outer surface; by said exposing subjecting said material imagewise to said light until said light has divided said structure imagewise into two distinct groups of latent image portions respectively lying in the exposed and the relatively unexposed areas of said structure and so differing in their adhesion powers that the image portions of one of said groups, including at least in part the portions of said pigment matter located in the corresponding areas of said structure, are selectively adherable to said receiving surface, and selectively transferable, as aforesaid; after said exposing wetting said structure and rendering pigment matter containing parts of one only of said groups of latent image portions more adhesive to said receiving surface than to the other parts of said sheet; then pressing said receiving surface against said outer surface; and thereafter separating said receiving surface from said outer surface and thereby selectively severing and transferring from the other parts of said sheet at least parts of said one group of image portions, including at least in part the portions of said pigment matter located in the corresponding areas of said structure, in the form of a pigment image obtained in adherence to said receiving surface without further development.

4. A photographic process for the production of a pigment image on a receiving surface, which comprises imagewise exposing to actinic light a sheet comprising a support carrying adherently but transferably over only one of its sides a composite structure consisting essentially of visually perceptible pigment matter linked to a sensitive organic colloid material comprising a hydrophilic colloidal binder and a compound which upon exposure to actinic light materially alters an adhesion power possessed by said material upon a wetting thereof with water, said compound being selected from the group consisting of light-sensitive diazo compounds and light-sensitive azido compounds, at least pigment matter containing parts of said structure being adherable to said receiving surface with a strength greater than that of their adherence to other parts of the sheet, and thus being transferable bodily from said support to said receiving surface, by a wetting of said structure with water followed by a pressing of said receiving surface against the outer surface of said structure and a separation of said receiving surface from said outer surface; by said exposing subjecting said material imagewise to said light until said light has divided said structure imagewise into two distinct groups of latent image portions respectively lying in the exposed and the relatively unexposed areas of said structure and so differing in their adhesion powers that the image portions of one of said groups, including at least in part the portions of said pigment matter located in the corresponding areas of said structure, are selectively adherable to said receiving surface, and selectively transferable, as aforesaid; after said exposing wetting said structure with water and rendering pigment matter containing parts of one only of said groups of latent image portions more adhesive to said receiving surface than to the other parts of said sheet, then pressing said receiving surface against said outer sheet; and thereafter separating said receiving surface from said outer surface and thereby selectively severing and transferring from said other parts at least parts of said one group of image portions, including at least in parts the portions of said pigment matter located in the corresponding areas of said structure, in the form of a pigment image obtained in adherence to said receiving surface without further development.

5. A photographic process for the production of a pigment image on a receiving surface, which comprises imagewise exposing to actinic light a sheet comprising a support carrying adherently but transferably over only one of its sides a composite structure consisting essentially of visually perceptible pigment matter linked to an organic colloid material comprising a hydrophilic colloidal binder and a condensation product of formaldehyde and a p-diazo-diphenylamine which upon exposure to said light materially alters an adhesion power possessed by said material upon a wetting thereof with water, at least pigment matter containing parts of said structure being adherable to said receiving surface with a strength greater than that of their adherence to other parts of the sheet, and thus being transferable bodily from said support to said receiving surface, by a wetting of said structure with water followed by a pressing of said receiving surface against the outer surface of said structure and a separation of said receiving surface from said outer surface; by said exposing subjecting said material imagewise to said light until said light has divided said structure imagewise into two distinct groups of latent image portions respectively lying in the exposed and the relatively unexposed areas of said structure and so differing in their adhesion powers that the image portions of one of said groups, including at least in part the portions of said pigment matter located in the corresponding areas of said structure, are selectively adherable to said receiving surface, and selectively transferable, as aforesaid; after said exposing wetting said structure with water and rendering pigment matter containing parts of only said unexposed latent image portions more adhesive to said receiving surface than to the other parts of said sheet, then pressing said receiving surface against said outer surface; and thereafter separating said receiving surface from said outer surface and thereby selectively severing and transferring from said other parts at least parts of said unexposed image portions, including at least in part the portions of said pigment matter located in said unexposed areas, in the form of a pigment image obtained in adherence to said receiving surface without further development.

6. A photographic process for the production of a pigment image on a receiving surface, which comprises imagewise exposing to actinic light a sheet comprising a support carrying adherently but transferably over only one of its sides a composite structure consisting essentially of visually perceptible pigment matter linked to an organic colloid material comprising a hydrophilic colloidal binder and a condensation product of formaldehyde and a p-diazo-diphenylamine which upon exposure to said light materially alters an adhesion power possessed by said material upon a wetting thereof with water, at least pigment matter containing parts of said structure being adherable to said receiving surface with a strength greater than that of their adherence to other parts of the sheet, and thus being transferable bodily from said support to said receiving surface, by a wetting of said structure with water followed by a pressing of said receiving surface against the outer surface of said structure and a separation of said receiving surface from said outer surface; by said exposing subjecting said material imagewise to said light until said light has divided said structure imagewise into two distinct groups of said structure image portions respectively lying in the exposed latent image portions and the relatively unexposed areas of said structure and so differing in their adhesion powers that the image portions of one of said groups, including at least in part the portions of said pigment matter located in the corresponding areas of said structure, are selectively adherable to said receiving surface, and selectively transferable, as aforesaid; after said exposing wetting said structure with water until the water has substantially reduced the cohesion of said binder in said unexposed latent image portions and rendered pigment matter containing parts of only said exposed latent image portions more adhesive to said receiving surface than to other parts of said sheet, then pressing said receiving surface against said outer surface; and thereafter separating said receiving surface from said outer surface and thereby selectively severing and transferring from said other parts at least parts of said exposed image portions, including at least in part the portions of said pigment matter located in said exposed areas, in the form of a pigment image obtained in adherence to said receiving surface without further development.

7. A photographic process for the production of a pigment image on a receiving surface, which comprises imagewise exposing to actinic light a flexible sheet comprising a support having a hydrophilic surface over one side and carrying adherently but transferably over said surface a composite structure consisting essentially of a layer of visually perceptible pigment matter overlaid by and linked to a layer of an organic colloid material comprising a hydrophilic colloidal binder and a condensation product of formaldehyde and a p-diazo-diphenylamine which upon exposure to said light materially alters an adhesion power possessed by said material upon a wetting thereof with water, said layer of pigment matter being hydrophobic and lying next to said hydrophilic surface and being permeated with passages to admit water to said surface, said structure being adherable to said receiving surface with a strength greater than that of its adherence to said support, and thus being transferable bodily from said support to said receiving surface, by a wetting of said structure with water followed by a pressing of said receiving surface against the outer surface of said structure and a separation of said receiving surface from said outer surface; by said exposing subjecting said layer of colloid material imagewise to said light until said light has divided said structure imagewise into two distinct groups of latent image portions respectively lying in the exposed and the relatively unexposed areas of said structure and so differing in their adhesion powers that the image portions of one of said groups, including the portions of said pigment matter layer located in the corresponding areas of said structure, are selectively adherable to said receiving surface, and selectively transferable, as aforesaid; after said exposing wetting said structure with water so as to render one only of said groups of latent image portions more adhesive to said receiving surface than to the other parts of said sheet, then pressing said receiving surface against said outer surface; and thereafter separating said receiving surface from said outer surface and thereby selectively severing and transferring from said other parts said one group of image portions, including the portions of said organic colloid material and of said pigment matter located in the corresponding areas of said structure, in the form of a pigment image adhering to said receiving surface.

8. A photographic process for the production of a pigment image on a receiving surface, which comprises imagewise exposing to actinic light a flexible sheet comprising a support having a hydrophilic surface and carrying adherently but transferably over said surface a composite structure consisting essentially of a layer of visually perceptible pigment matter overlaid by and linked to a layer of an organic colloid material sensitive to said light, said material containing a compound which upon exposure to actinic light materially alters an adhesion power possessed by said material upon a wetting thereof with water, said compound being selected from the group consisting of light-sensitive diazo compounds and light-sensitive azido compounds, said layer of pigment matter being hydrophobic and lying next to said hydrophilic surface, wetting said structure with water so as to render one only of said groups of latent image portions more adhesive to said receiving surface than to the other parts of said sheet, then pressing said receiving surface against said outer surface; and thereafter separating said receiving surface from said outer surface and thereby selectively severing and transferring from said other parts said one group of image portions, including the portions of said organic colloid materials and of said pigment matter located in the corresponding areas of said structure, in the form of a pigment image adhering to said receiving surface.

9. A light-sensitive sheet for the production of a pigment image, comprising a sheet-like support carrying adherently but transferably over only one of its sides a composite structure consisting essentially of a frangible layer of a mixture of a finely divided visually perceptible pigment and a binder therefor, linked to a distinct layer of a light-sensitive mixture of a hydrophilic colloid and a compound which upon exposure to actinic light material alters an adhesion power possessed by said colloid upon a wetting thereof with water, said compound being selected from the group consisting of light-sensitive diazo compounds and light-sensitive azido compounds, said light-sensitive layer being substantially free of said pigment and said frangible layer being substantially free of said compound, said light-sensitive layer lying next to said support and being covered by said pigment layer and adhering to said pigment layer more strongly than to said support, said layers being permeable by water so as to admit water to the interface of said structure with said support, one of the surfaces at said interface being hydrophilic and the other being hydrophobic, said light sensitive layer upon being wetted with water becoming readily tearable, at least pigment matter containing parts of said structure being adherable to a receiving surface with a strength greater than that of their adherence to other parts of the sheet, and thus being transferable bodily from said support to said receiving surface, by a wetting of said structure with water followed by a pressing of said receiving surface against the outer surface of said structure and a separation of said receiving surface from said outer surface, said structure being divisible imagewise by an imagewise exposure of said light-sensitive layer to said light into two distinct groups of latent image portions respectively lying in the exposed and the relatively unexposed areas of said structure and so differing in their adhesion powers that the image portions of one of said groups, including at least in part the portions of said pigment matter located in the corresponding areas of said structure, are selectively adherable to said receiving surface as aforesaid and severable from the other parts of the sheet, and thus are selectively transferable as aforesaid, to form an image of said pigment matter on said receiving surface.

10. A light-sensitive sheet for the production of a pigment image, comprising a sheet-like support carrying adherently but transferably over only one of its sides a composite structure consisting essentially of a frangible layer of a finely divided visually perceptible pigment linked to a distinct layer of a light-sensitive mixture of a hydrophilic colloid and a compound which upon exposure to actinic light material alters an adhesion power possessed by said colloid upon a wetting thereof with water, said compound being selected from the group consisting of light-sensitive diazo compounds and light-sensitive azido compounds, said light-sensitive layer being substantially free of pigment and said pigment layer substantially free of said light-sensitive compounds, said pigment layer lying next to said support and being covered by said light-sensitive layer and adhering to said light-sensitive layer more strongly than to said support, said layers being permeable by water so as to admit water to the interface of said structure with said support, one of the surfaces at said interface being hydrophilic and the other being hydrophobic, said light-sensitive layer upon being wetted with water becoming readily tearable and adhesive to a receiving surface, said structure being adherable to said receiving surface with a strength greater than that of its adherence to said support, and thus being transferable bodily from said support to said receiving surface, by a wetting of said structure with water followed by a pressing of said receiving surface against the outer surface of said structure and a separation of said receiving surface from said outer surface, said structure being divisible imagewise by an imagewise exposure of said light-sensitive layer to actinic light into two distinct groups of latent image portions respectively lying in the exposed and the relatively unexposed areas of said structure and so differing in their adhesion powers that the image portions of one of said groups, including the portions of said pigment layer located in the corresponding areas of said structure, are selectively adherable to said receiving surface as aforesaid and severable from the other parts of the sheet, and thus are selectively transferable as aforesaid, to form an image of said pigment matter on said receiving surface.

11. A light-sensitive sheet for the production of a pigment image, comprising a sheet-like support having a hydrophilic surface over one side thereof and carrying adherently but transferably over said surface a composite structure consisting essentially of a frangible layer of a hydrophobic mixture of a major proportion of a finely divided visually perceptible pigment and a minor proportion of a hydrophobic binder linked to a distinct layer of a light-sensitive mixture of a hydrophilic colloid and a compound which upon exposure to actinic light material alters an adhesion power possessed by said colloid upon a wetting thereof with water, said compound being selected from the group consisting of light-sensitive diazo compounds and light-sensitive azido compounds, said light-sensitive layer being substantially free of pigment and said pigment layer being substantially free of said light-sensitive compounds, said pigment layer being hydrophobic and lying on said hydrophilic surface and being covered by said light-sensitive layer and adhering to the latter more strongly than to said support, said layers being permeable by water so as to admit water to the interface of said pigment layer with said support, said light-sensitive layer upon being wetted with water becoming readily tearable and adhesive to a receiving surface, said structure being adherable to said receiving surface with a strength greater than that of its adherence to said support, and thus being transferable bodily from said support to said receiving surface, by a wetting of said structure with water followed by a pressing of said receiving surface aganst the outer surface of said structure and a separation of said receiving surface from said outer surface, said structure being divisible imagewise by an imagewise exposure of said light-sensitive layer to actinic light into two distinct groups of latent image portions respectively lying in the exposed and the relatively unexposed areas of said structure and so differing in their adhesion powers that the image portions of one of said groups, including the portions of said pigment layer located in the corresponding areas of said structure, are selectively adherable to said receiving surface as aforesaid and severable from the other parts of the sheet, and thus are selectively transferable as aforesaid, to form an image of said pigment matter on said receiving surface.

12. A light-sensitive sheet for the production of a pigment image, comprising a sheet-like support having over one of its sides a hydrophilic surface formed with a myriad of recesses, said surface carrying adherently but transferably thereover a composite structure lying at least in part in said recesses and consisting essentially of a frangible layer of a hydrophobic mixture of a major proportion of a finely divided visually perceptible pigment and a minor proportion of a hydrophobic binder, linked to a layer of a distinct layer of a light-sensitive mixture of a hydrophilic colloid and a compound which upon exposure to actinic light material alters an adhesion power possessed by said colloid upon a wetting thereof with water, said compound being selected from the group consisting of light-sensitive diazo compounds and light-sensitive azido compounds, said light-sensitive layer being substantially free of pigment and said pigment layer being substantially free of said light-sensitive compounds, said hydrophobic pigment layer being next to said hydrophilic surface and covered by said light-sensitive layer and adhering to the latter more strongly than to said support, said layers being permeable by water so as to admit water to the interface of said pigment layer with said support, said light-sensitive layer upon being wetted with water becoming readily tearable and adhesive to a receiving surface, said structure being adherable to said receiving surface with a strength greater than that of its adherence to said support, and thus being transferable bodily from said support to said receiving surface, by a wetting of said structure with water followed by a pressing of said receiving surface against the outer surface of said structure and a separation of said receiving surface from said outer surface, said structure being divisible imagewise by an imagewise exposure of said light-sensitive layer to actinic light into two distinct groups of latent image portions respectively lying in the exposed and the relatively unexposed areas of said structure and so differing in their adhesion powers that the image portions of one of said groups, including the portions of said pigment layer located in the corresponding areas of said structure, are selectively adherable to said receiving surface as aforesaid and severable from the other parts of the sheet, and thus are selectively transferable as afore-said, to form an image of said pigment matter on said receiving surface.

13. A light-sensitive sheet for the production of a pigment image, comprising a sheet-like support, said support having a hydrophilic surface composed of at least partially deacylated cellulose ester and formed with a myriad of uniformly interspersed recesses and minute elevations, said surface carrying adherently but transferably thereover a composite structure lying at least in part in said recesses and consisting essentially of a frangible layer of a hydrophobic mixture of a major proportion of a finely divided visually perceptible pigment and a minor proportion of a hydrophobic binder, linked to a distinct layer of a light-sensitive mixture of a hydrophilic colloid and a compound which upon exposure to actinic light material alters an adhesion power possessed by said colloid upon a wetting thereof with water, said compound being selected from the group consisting of light-sensitive diazo compounds and light-sensitive azido compounds, said light-sensitive layer being substantially free of pigment and said pigment layer being substantially free of said light-sensitive compounds, said hydrophobic pigment layer being next to said hydrophilic surface and covered by said light-sensitive layer and adhering to the latter more strongly than to said support, said layers being permeable by water so as to admit water to the interface of said layer with said support, said light-sensitive layer upon being wetted with water becoming readily tearable and adhesive to a receiving surface, said structure being adherable to said receiving surface with a strength greater than that of its adherence to said support, and thus being transferable bodily from said support to said receiving surface, by a wetting of said structure with water followed by a pressing of said receiving surface against the outer surface of said structure and a separation of said receiving surface from said outer surface, said structure being divisible imagewise by an imagewise exposure of said light-sensitive layer to actinic light into two distinct groups of latent image portions respectively lying in the exposed and the relatively unexposed areas of said structure and so differing in their adhesion powers that the image portions of one of said groups, including the portions of said pigment layer located in the corresponding areas of said structure, are selectively adherable to said receiving surface as aforesaid and severable from the other parts of the sheet, and thus are selectively transferable as aforesaid, to form an image of said pigment matter on said receiving surface.

14. A light-sensitive sheet for the production of a pigment image, comprising a sheet-like support, said support having a hydrophilic surface composed of at least partially deacylated cellulose ester and formed with a myriad of uniformly interspersed recesses and minute elevations, said surface carrying adherently but transferably thereover a composite structure lying at least in part in said recesses and consisting essentially of a frangible layer of a hydrophobic mixture of a major proportion of carbon black and a minor proportion of a hydrophobic binder, linked to a distinct layer of a light-sensitive mixture of a hydrophilic colloid and a light-sensitive condensation product of formaldehyde and a p-diazo-diphenylamine, said light-sensitive layer being substantially free of pigment and said frangible layer being substantially free of said light-sensitive mixture, said hydrophobic pigment layer being next to said hydrophilic surface and covered by said light-sensitive layer and adhering to the latter more strongly than to said support, said layers being permeable by water so as to admit water to the interface of said pigment layer with said support, said light-sensitive layer upon being wetted with water becoming readily tearable and adhesive to a receiving surface, said structure being adherable to said receiving surface with a strength greater than that of its aherence to said support, and thus being transferable bodily from said support to said receiving surface, by a wetting of said structure with water followed by a pressing of said receiving surface against the outer surface of said structure and a separation of said receiving surface from said outer surface, said structure being divisible imagewise by an imagewise exposure of said light-sensitive layer to actinic light into two distinct groups of latent image portions respectively lying in the exposed and the relatively unexposed areas of said structure and so liffering in their adhesion powers that the image portions of one of said groups, including the portions of said pigment layer located in the corresponding areas of said structure, are selectively adherable to said receiving surface as aforesaid and severable from the other parts of the sheet, and thus are selectively transferable as aforesaid, to form an image of said pigment matter on said receiving surface.

15. A light-sensitive sheet for the production of a pigment image, comprising a sheet-like support, said support having a hydrophilic surface composed of at least partially deacylated cellulose ester and formed with a myriad of uniformly interspersed recesses and minute elevations, said surface carrying adherently but transferably thereover a composite structure lying at least in part in said recesses and consisting essentially of a frangible layer of a hydrophobic mixture of a major proportion of carbon black and a minor proportion of a hydrophobic binder, linked to a distinct layer of a light-sensitive mixture of a hydrophilic colloid and 4,4'-diazido-stilbene disulphonic acid-2,2', said light-sensitive layer being substantially free of pigment and said frangible layer being substantially free of said light-sensitive mixture, said hydrophobic pigment layer being next to said hydrophilic surface and covered by said light-sensitive layer and adhering to the latter more strongly than to said support, said layers being permeable by water so as to admit water to the interface of said pigment layer with said support, said light-sensitive layer upon being wetted with water becoming readily tearable and adhesive to a receiving surface, said structure being adherable to said receiving surface with a strength greater than that of its adherence to said support, and thus being transferable bodily from said support to said receiving surface, by a wetting of said structure with water followed by a pressing of said receiving surface against the outer surface of said structure and a separation of said receiving surface from said outer surface, said structure being divisible imagewise by an imagewise exposure of said light-sensitive layer to actinic light into two distinct groups of latent image portions respectively lying in the exposed and the relatively unexposed areas of said structure and so differing in their adhesion powers that the image portions of one of said groups, including the portions of said pigment layer located in the corresponding areas of said structure, are selectively adherable to said receiving surface as aforesaid and severable from the other parts of the sheet, and thus are selectively transferable as aforesaid, to form an image of said pigment matter on said receiving surface.

16. A light-sensitive sheet as claimed in claim 9, said pigment layer mixture being a hydrophilic mixture of said pigment and a hydrophilic binder.

17. A light-sensitive sheet as claimed in claim 9, said pigment layer mixture being a hydrophobic mixture of a major portion of said pigment and a minor proportion of a hydrophobic binder.

18. A light-sensitive sheet as claimed in claim 10, said pigment layer being a frangible layer of a water-soluble visually perceptive pigment.

19. A light-sensitive sheet as claimed in claim 10, said pigment layer being a frangible layer of a hydrophilic mixture of a visually perceptive pigment and a hydropholic binder.

References Cited in the file of this patent
UNITED STATES PATENTS

| | | |
|---|---|---|
| 1,118,479 | Dodge | Nov. 24, 1914 |
| 2,100,063 | Zahn | Nov. 23, 1937 |
| 2,602,741 | Van der Grinten et al. | July 8, 1952 |
| 2,602,742 | Buskes et al. | July 8, 1952 |
| 2,763,553 | Clark | Sept. 18, 1956 |
| 2,772,160 | Hepher | Nov. 27, 1956 |

UNITED STATES PATENT OFFICE
CERTIFICATE OF CORRECTION

Patent No. 3,091,528                                         May 28, 1963

Willem Marie Buskes

It is hereby certified that error appears in the above numbered patent requiring correction and that the said Letters Patent should read as corrected below.

Column 2, line 23, for "he" read -- be --; column 6, line 11, for "is" read -- in --; column 19, line 25, for "gm.$^3$" read -- cm.$^3$ --; column 24, line 7, for "atransparent" read -- a transparent --; column 25, line 29, for "sensitive" read -- sensitized --; line 63, for "inthe" read -- in the --; same column 25, line 74, for "sensitive" read -- sensitized --; column 26, line 38, for "visibly" read -- visually --; same column 26, line 39, and column 27, line 4, for "sensitive", each occurrence, read -- sensitized --; same column 27, line 34, for "sheet" read -- surface --; line 38, for "parts" read -- part --; column 29, line 39, after "surface," insert the following:

> said structure being adherable to said receiving surface with a strength greater than that of its adherence to said support, and thus being transferable bodily from said support to said receiving surface, by a wetting of said structure with water followed by a pressing of said receiving surface against the outer surface of said structure and a separation of said receiving surface from said outer surface; by said exposing subjecting said layer of colloid material imagewise to said light until said light has divided said structure imagewise into two distinct groups of latent image portions respectively lying in the exposed and the relatively unexposed areas of said structure and so differing in their adhesion powers that the image portions of one of said groups, including the portions of said pigment matter layer located in the corresponding areas of said structure, are selectively adherable to said receiving surface, and selectively transferable, as aforesaid; after said exposing same column 29, line 47, for "materials" read -- material --; column 30, line 32, after "layer" insert -- being --; lines 50 and 51, after "imagewise" insert -- exposure --; column 31, line 41, strike out "a layer of"; column 33, line 9, for "liffering" read -- differing --; column 34, line 31, for "hydropholic" read -- hydrophilic --.

Signed and sealed this 24th day of December 1963.

(SEAL)
Attest:

ERNEST W. SWIDER
Attesting Officer

EDWIN L. REYNOLDS
Acting Commissioner